Patented Mar. 3, 1942

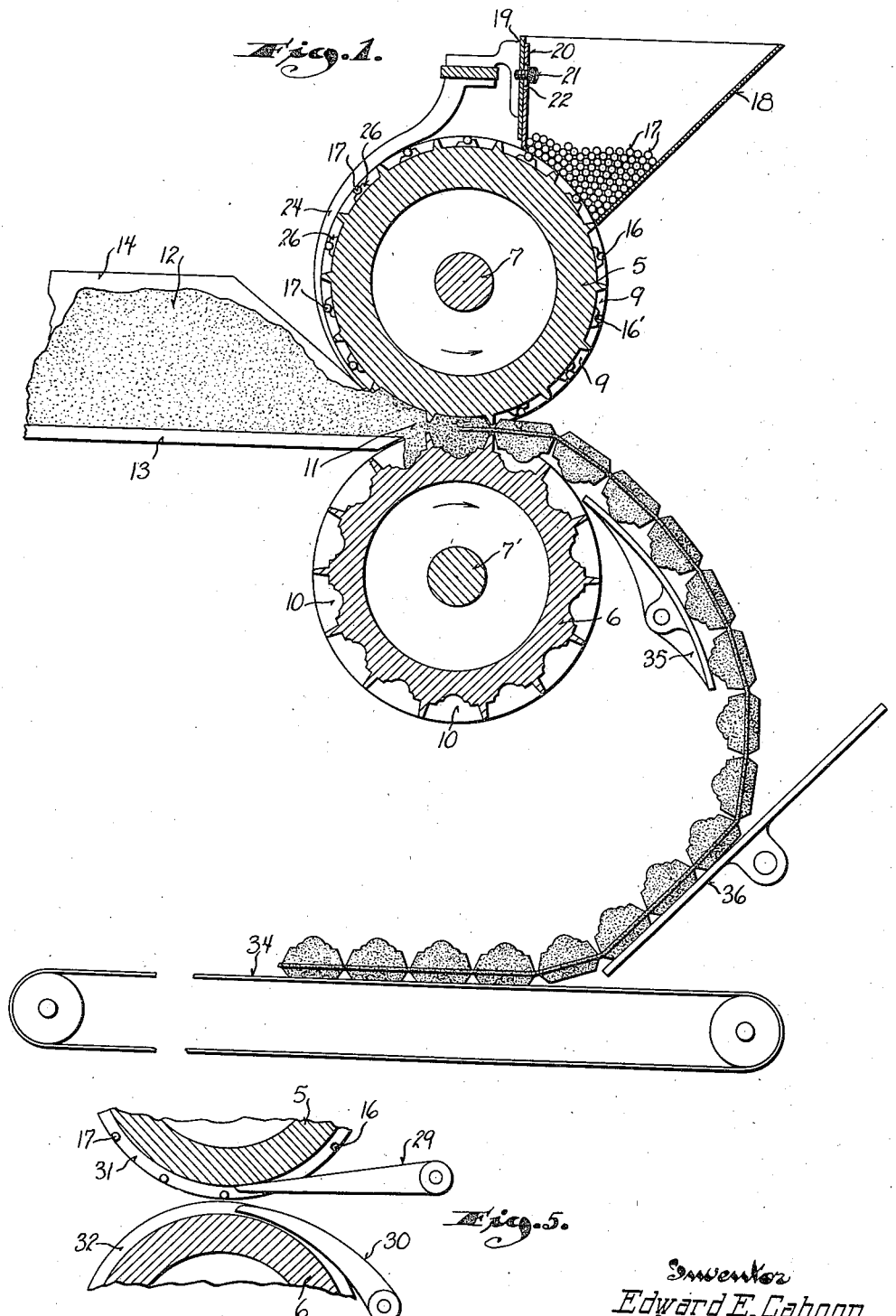

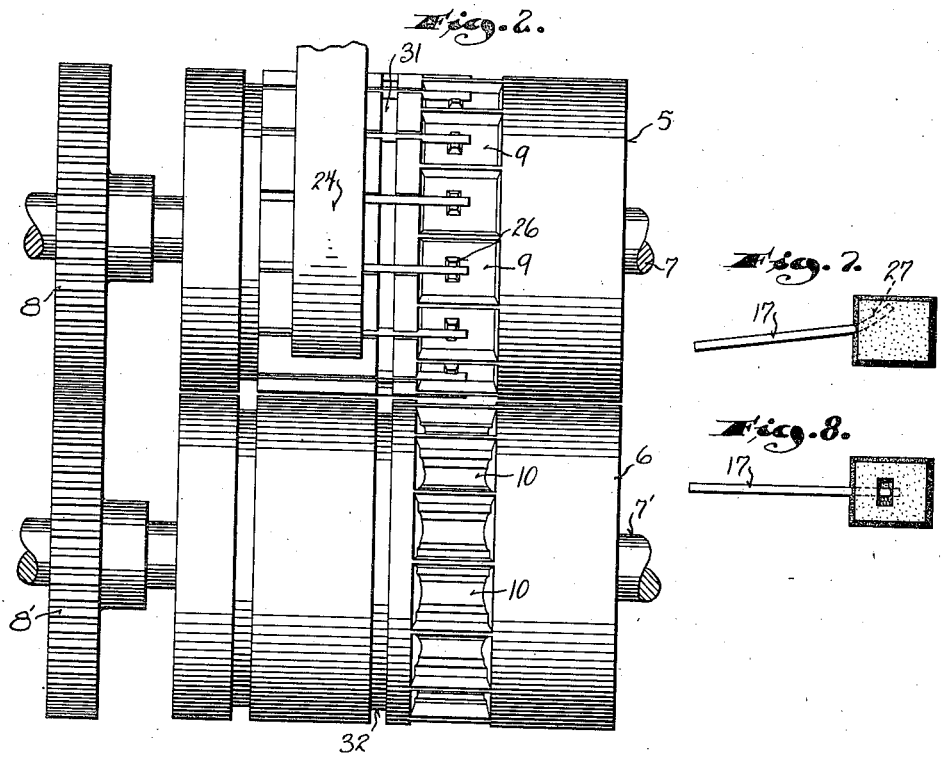
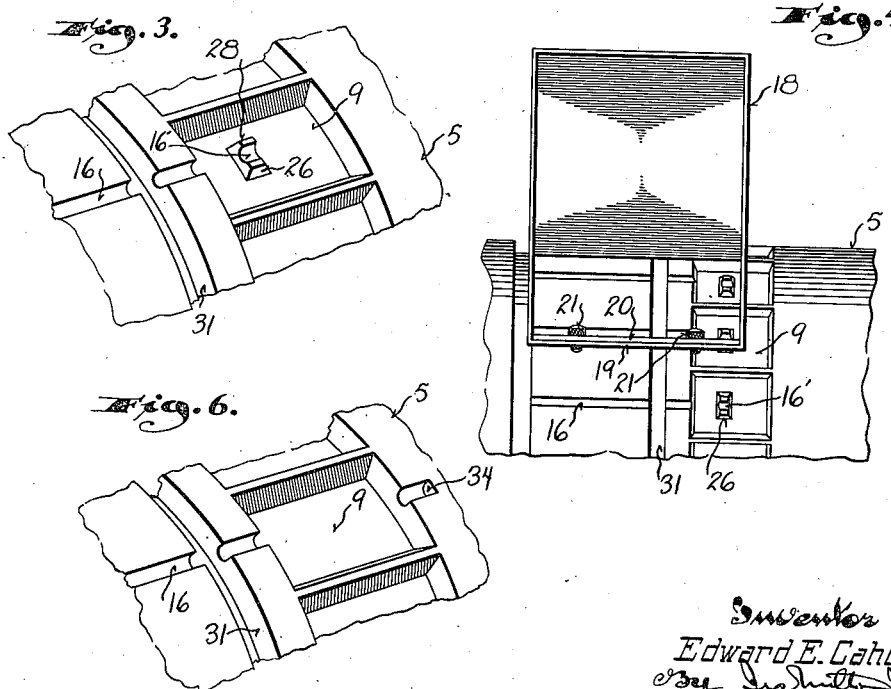

2,274,664

UNITED STATES PATENT OFFICE 2,274,664

CANDY FORMING MACHINE

Edward E. Cahoon, Racine, Wis.

Application February 3, 1940, Serial No. 317,150

7 Claims. (Cl. 107—8)

This invention relates to candy forming machines of the type illustrated in Patent No. 1,635,682, issued July 12, 1927, to Z. M. Marr, and which molds or forms candy suckers and simultaneously embeds handles in the suckers.

Machines of this type form candy suckers on the ends of substantially rigid wooden sticks held so as to project into the mold cavities of one of the molding cylinders to be embedded in the candy as it flows into the mold.

The great majority of users of confections of this type are children who unthinkingly leave the sucker in their mouths during their various activities. Consequently, a child falling while holding a sucker in his mouth unattended was exposed to serious injury due to the rigidity of the wooden handles which forced the confection into the palate or throat of the child and sometimes inflicted fatal injuries.

With a view toward overcoming these dangers, this invention contemplates providing lollipops or candy suckers with a bendable semi-rigid handle so as to render the use of confections of this type noninjurious to children.

One type of handle which has proved satisfactory with respect to safety is the semi-rigid twisted paper or Cellophane handle. A lollipop handle of this nature has sufficient rigidity to effectively support the confection but is readily collapsible when force is applied thereto.

The safety feature of these twisted paper handles, however, has in the past prohibited their widespread use for the present candy forming machines were incapable of handling the same without objectionably bending them during embedding in the candy, either if forced endwise into the formed candy, or if held in the mold prior to forming the candy therein. This resulted in the production of candy suckers whose handles projected therefrom at a wide variety of angles which obviously detracted from the appearance of the sucker.

This present invention, therefore, has as one of its objects the provision of a candy forming machine suitable for producing candy suckers with semi-rigid or bendable handles.

Another object of this invention resides in the provision of a molding cylinder for candy forming machines having means in the mold cavities thereof for positively preventing displacement of the portion of the stick to be embedded in the confection.

Another object of this invention resides in the provision of a candy forming machine suitable for handling semi-rigid bendable sucker handles and so designed as to insure the formation of the sucker on the ends of the handles in perfect alignment therewith.

More specifically, this invention has as one of its objects the provision of a molding cylinder having grooved lugs in the bottoms of the mold cavities therein which align with handle receiving grooves in the molding cylinder and cooperate with the same to support each end of a nonrigid bendable handle against displacement.

A further object of this invention resides in the provision of improved means for supplying sucker handles to the molding cylinder to insure but a single handle being received in each of the handle receiving grooves in the cylinder.

Still another object of this invention resides in the provision of a candy forming machine of the character described in which the discharge of candy is controlled to protect designs formed on one side of the candy.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof and in which:

Figure 1 is a cross sectional view through a candy forming machine illustrating the improvements therein;

Figure 2 is a side elevational view of a portion of the machine illustrated in Figure 1 as viewed from the feed-in side thereof;

Figure 3 is a fragmentary perspective view of a portion of the handle carrying molding cylinder illustrating one of the mold cavities thereof;

Figure 4 is a plan view of a portion of the machine illustrated in Figure 1;

Figure 5 is a detail view partly in section illustrating the manner in which suckers formed on the machine are removed from the mold cavities thereof;

Figure 6 is a view similar to Figure 3 illustrating a modified form of mold cavity; and Figures 7 and 8 are views illustrating candy suckers equipped with the non-rigid bendable handle of this invention.

Referring now particularly to the accompanying drawings, in which like numerals indicate like parts, the numerals 5 and 6 represent the upper and lower molding cylinders or forming dies of the machine respectively. These cylinders or dies are carried by shafts 7 and 7' respectively, journalled in suitable bearings (not shown) which rotatably mount the cylinders in spaced apart parallel relationship. Meshing gears 8 and 8' on the shafts 7 and 7' drivingly connect the cylinders for rotation at the same speed but in opposite directions when either of the shafts is connected to a power source.

The upper molding cylinder 5 is provided with a plurality of closely spaced molding cavities 9 arranged circumferentially on the peripheral surface of the cylinder. These cavities may be of any desired shape, but for illustration have been shown as rectangular in outline, with the bottoms of the cavities spaced inwardly from but concentric to the cylindrical surface of the cylinder so as to form a flat bottom for the sucker. The lower cylinder 6 is provided with an equal number of similarly shaped molding cavities 10, each of which registers with one of the molding cavities in the adjacent upper cylinder 5 during rotation of the cylinders in opposite directions.

The bottoms of the mold cavities 10, however, are preferably shaped so as to form a raised design on the molded sucker as shown.

The space between the cylinders at the area thereof in which the mold cavities are situated therefore constitutes a molding zone 11, in which candy to be molded is fed. The candy, indicated as at 12 is fed into the molding zone 11 between the cylinders in the form of a rope over a feed board 13, and is guided between two adjustable side walls 14 so as to enter the molding zone in line with the mold cavities. At this stage, the candy is in a hot, plastic state, with a consistency approximating that of putty.

In operation, the cylinders which are slightly spaced apart are rotated in the direction shown by the arrows in Figure 1, and candy is fed into the molding zone between the cylinders to be molded in the cooperating mold cavities thereof to the shape of the cavities. The ribs formed by the side walls of adjacent cavities cooperate to leave a narrow strip of candy connecting each of the molded suckers discharged from between the cylinders, so that the suckers are discharged in the form of an endless band.

As in the aforementioned patent, No. 1,635,682, the machine of this invention also provides for embedding the sucker handles in the candy by causing the plastic candy to flow around the ends of handles projecting into the mold cavities of the upper cylinder 5.

In the customary manner therefore, longitudinally extending grooves 16 are formed in the surface of the upper cylinder to one side of the mold cavities 9, so that one groove connects with each of the mold cavities. Each of the grooves 16 is of a depth to accommodate but a single handle therein, and to hold the same spaced above the bottoms of the cavities.

The candy handles 17, which are semi-rigid and bendable, are made of twisted paper or Cellophane and are therefore safe for children. These semi-rigid and bendable handles are supplied to the cylinder 5 by means of a hopper 18 positioned near the top thereof. The hopper 18 is adapted to at all times hold a supply of handles longitudinally against the cylindrical surface of the cylinder in line with its grooved area so that handles are transferred from the hopper to the cylinder grooves 16 as the cylinder rotates.

To insure the transfer of only one handle to a groove, the longitudinally extending wall 19 of the hopper which the grooves pass in leaving the hopper is provided with a stripper plate 20. The stripper plate 20 is adjustable by means of thumb screws 21 extending through slots 22 in the plate to be threadedly received in the adjacent wall 19. The plate 20 is thus securely held with respect to the hopper wall 19 with its lower edge adjacent to the cylinder adjustable to closely overlie the surface thereof.

The hopper 18 is so positioned longitudinally of the cylinder 5 as to deposit handles in the grooves 16 with one end portion of the handles projecting into their respective mold cavities. As stated, the cylinder 5 receives handles near its upper surface and carries the same for substantially a half of a revolution downwardly into the molding zone where they are embedded in the candy formed in the molds.

To retain the handles in their proper position in the cylinder grooves 16 until they are carried into the molding zone, a guide finger 24 is provided to overlie that portion of the cylinder which receives the handles and carries the same downwardly into the molding zone. The guide finger 24 may be supported from the supply hopper 18 as shown or from any suitable support.

The structure thus defined is similar to the type of candy forming machine illustrated in the aforesaid Patent No. 1,635,682. This type of machine is suitable for use with rigid wooden sticks but when semi-rigid paper or Cellophane handles are to be embedded in the confection, the end portion of the handle extending into the mold cavity is subjected to lateral forces in the molding zone during forming of the candy which result in bending the embedded portions of the handle in an objectionable manner. The entire handle thus becomes out of alignment with the body of the sucker as illustrated in Figure 7. This results from the fact that the paper or Cellophane handles have a degree of inherent resiliency which tends to straighten out the free end of the handle to a straight line position with the embedded portion after the suckers are discharged from the cylinders.

In the present invention, however, means are provided to prevent the ends of the bendable candy handles from being deformed in their passage through the molding zone by the forces exerted thereon as the candy flows into the mold.

To this end, each of the mold cavities 9 is provided with an upstanding lug 26 in its bottom and preferably near the center of the bottom wall of the cavities. Each of the lugs is grooved as at 16' in such a manner that the lugs cooperate with the grooves 16 in supporting the opposite ends of the candy handles 17. Thus it will be seen that the end of the handle projecting into the mold cavity is firmly supported above the bottom of its cavity against lateral forces during its passage through the molding zone and is thereby prevented from being bent as shown at 27 in Figure 7.

During normal operation of the candy forming machine a force in a direction opposite to that in which candy is being fed into the working zone is exerted by the candy on the end portions of the handle extending into the mold cavities, and for this reason the lugs 26 are extended as at 28 at one side of their grooves so as to positively prevent the end portion of the handle from being bent laterally in said direction.

Inasmuch as the handles are thus held against all tendency to be bent out of shape, the sucker thus formed has a perfectly straight handle which aligns with the body of the confection as shown in Figure 8.

As is customary, stripper fingers 29 and 30 operating in circumferential grooves 31 and 32 on the upper and lower cylinders respectively, effect the removal of the formed candy suckers from the molding cylinders.

If desired, a modified construction such as shown in Figure 6 may be employed to effectively prevent bending of the end portion of the handle to be embedded in the candy.

In this form of the invention the major length of the stick is supported in the same manner as previously described but the end portion of the stick projecting into the mold cavity 9 is supported at the opposite sides of the cavity in an extension 34 of the groove 16. The handles are thus held at each end and are secure against the lateral forces exerted on the same as the candy is pressed into the molds.

As hereinbefore stated, the candy suckers are formed in connected relationship with respect to each other, and are discharged from the molding cylinders in an endless band with the design lowermost. Inasmuch as the candy is still in a plastic state after molding, the conventional procedure is to transport the suckers on a conveyor to suitable drying and hardening means in the direction in which they are discharged from the machine.

This is objectionable, however, for the suckers are discharged face down, in other words, with their design lowermost, and as the candy remains plastic until it is passed through the drying and hardening means, the design was invariably damaged in contacting the conveyor.

The present invention overcomes this objection to past practices by reversing the travel of the connected suckers after they leave the molding cylinders so that they rest on their flat backs on the conveyor 34. To this end, an arcuate slide 35 of a length to support approximately four of the connected suckers at a time is positioned ahead of and slightly below the top of the lower molding cylinder to receive the endless band of connected suckers discharged from the machine. From the slide 35, the suckers travel by gravity in a downward direction and are directed onto the conveyor 34 by an inclined slide 36. The slide 36 is positioned at such an angle that only the backs of the suckers contact the same in their passage thereover to the conveyor, and they are delivered face up to the conveyor.

Consequently, reversing the discharge of the suckers in this manner safeguards the design thereon, for it is seen that the only surface contacted by the design is that of the arcuate slide 35. This is not objectionable, however, as the full weight of the suckers is not taken by the slide 35 due to its downwardly inclined angle.

From the foregoing description taken in connection with the accompanying drawings, it will be apparent to those skilled in the art that this invention provides a candy forming machine particularly well suited for embedding semi-rigid or bendable safety handles in candy suckers.

It is also apparent that jamming of the machine resulting from the transfer of additional handles to the cylinder grooves is precluded by the adjustable stripper plate on the feed hopper.

In addition, the improved manner of discharging suckers from the machine prevents damage to the design imprinted on the sucker.

What I claim as my invention is:

1. In a candy forming machine of the character described: a molding die having a plurality of mold cavities in its surface and having a groove connected with each of said cavities for supporting one end of a handle for the candy with its other end projecting into one of the mold cavities to be embedded in the candy formed therein; and means in the bottom of each mold cavity cooperating with the handle receiving grooves of the molding die to support the other end of a candy handle, said means preventing lateral bending of the handle as the candy is pressed into the mold.

2. In a candy forming machine: a molding die having a plurality of mold cavities in its surface; an upstanding lug in the bottom of each of said cavities, each of said lugs having a handle receiving groove therein providing a support for one end of a candy handle above the bottom of the cavities, and said die having a plurality of longitudinal handle receiving grooves in its surface one adjacent to and connecting with each of the cavities therein and aligned with the grooves in the lugs for supporting the other end of a candy handle.

3. In a candy forming machine: a molding die having a plurality of mold cavities in its surface, said die being movable past a molding zone in which candy is pressed into the mold cavities thereof; means for holding confection handles in position on the die with one end portion of each handle extending into one of the mold cavities including a notched support in each mold cavity for firmly supporting the end portion of the handle to be embedded in the candy against displacement and bending as the candy is pressed into the cavities.

4. In a candy forming machine: a molding die having a plurality of mold cavities in its surface, said die being movable past a molding zone in which candy is pressed into the mold cavities thereof; means for holding confection handles in position on the die with one end portion of each handle extending into one of the mold cavities including, spaced apart notched supports on the die for supporting the opposite ends of the handles, one of said notched supports being positioned in each mold cavity to counteract the bending forces applied to the end of the handle in the mold cavity as candy is pressed thereinto.

5. In a molding die having a mold cavity in its surface: notched means in said cavity for receiving one end of a candy handle and for holding the same in a predetermined position with respect to the cavity as the candy is molded therein, whereby lateral bending of said end of the handle is positively precluded.

6. In a candy forming machine of the character described: a pair of adjacent parallel molding cylinders rotatably mounted one above the other; a plurality of mold cavities in each of said cylinders arranged to register as the cylinders are rotated in opposite directions to mold candy fed between the cylinders to the shape of the mold cavities therein; the bottom of the mold cavities of said upper cylinder being substantially concentric to the axis of the cylinder and the bottoms of the cavities in the lower cylinder having irregular shape so as to produce a raised design on the candy molded therein, whereby the candy is discharged from the cylinders with its raised design lowermost; means for receiving molded candy discharged from the cylinders; and means for delivering candy from the cylinders to said receiving means and for reversing the position of the candy so that the same rests on the receiving means with its raised design uppermost.

7. In a candy forming machine of the character described: a pair of superimposed rotatable molding cylinders each having a number of mold cavities in its periphery cooperating to form plastic candy fed between the cylinders to the shape of the molds, the bottoms of the mold cavities in the lower cylinder being shaped to form a raised design on one side of the candy; said cylinders being spaced apart a distance such as to leave a thin web of candy connecting the molded candies so that the same are discharged from the cylinders in a continuous flexible band with the raised design thereon lowermost; means for conveying the band of connected candies from the cylinders; and means for delivering the connected candies to said last named means and for reversing their position so that the same rest on the conveying means with their raised designs uppermost.

EDWARD E. CAHOON.